INVENTOR.
BURGESS DARROW
BY
Oldham & Oldham
ATTORNEYS

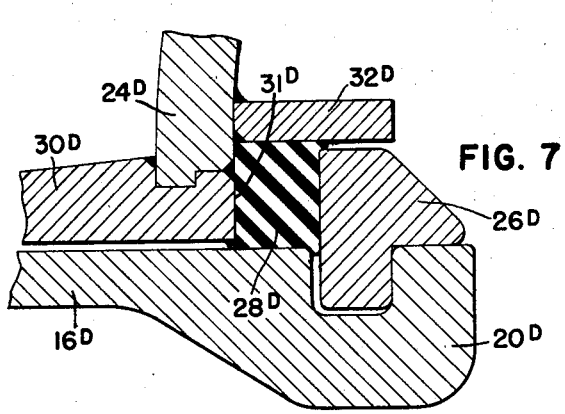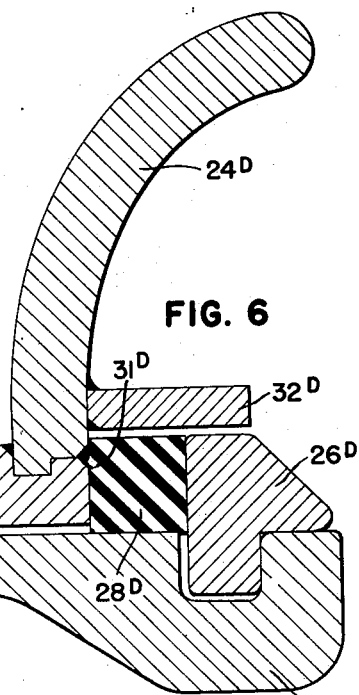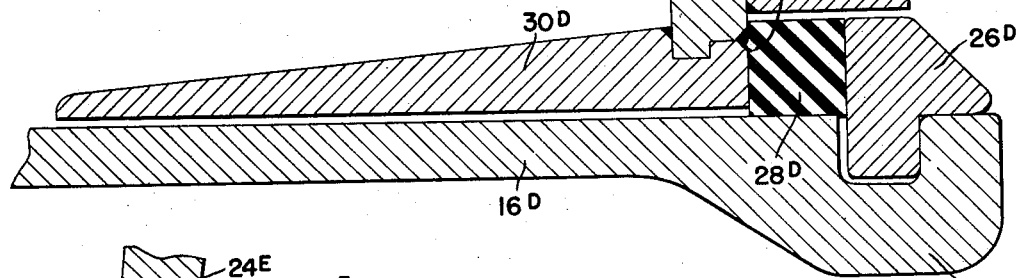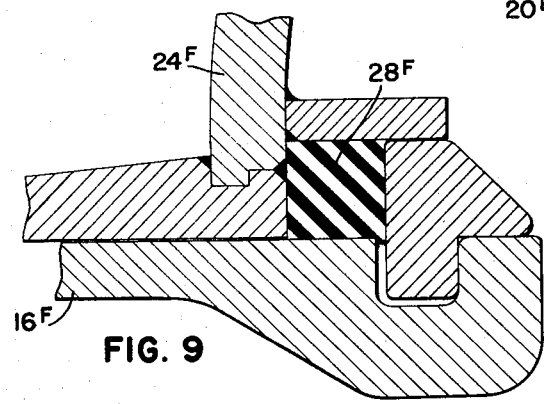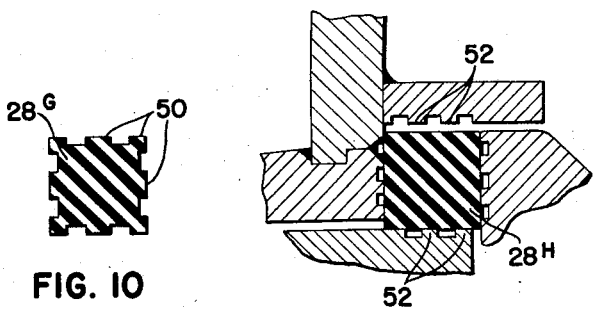

United States Patent Office 2,894,556
Patented July 14, 1959

2,894,556

PRESSURE SEALED MULTI-PART RIM WITH CONFINED RUBBER-LIKE SEALING GASKET

Burgess Darrow, Akron, Ohio

Application November 5, 1952, Serial No. 318,881

3 Claims. (Cl. 152—410)

This invention relates to rims for mounting tubeless pneumatic tires of the open-beaded type, and, more particularly, is concerned with multi-part rims for mounting relatively large tubeless tires for truck, bus, earth mover and like use.

It has been known heretofore to employ tubeless open-beaded pneumatic tires of passenger car and like size upon endless one piece rims of the well known drop center type. However, so far as I am aware it has never been proposed commercially to make a relatively large tire, such as a truck or bus tire, of the tubeless type for the reason that these large tires are necessarily mounted upon multi-part rims, usually including a base portion which is endless, an endless removable side ring or flange, and a split lock ring or an endless base and a split side ring. Such multi-part rims are necessary in order to allow for the mounting and demounting of the large pneumatic tire thereon. It has been considered mechanically unsound and is not practical to attempt to mount large tires of the indicated type with heavy double bead structure on one piece drop center rims. Known multi-part rims of the type adapted for mounting large truck, bus and earth mover tires have never provided the sealed rim enclosure which is necessary between the beads of a tubeless tire. It is suggested in U.S. Patent No. 853,594 to provide a multi-part rim which is sealed by a radially expanding member but this structure is outmoded and cumbersome, is not adapted to mounting large present day tires, and necessary manufacturing tolerances may cause difficulty.

It is the general object of my invention to avoid and overcome the foregoing and other difficulties of and objections to prior art practices by the provision of an improved sealed multi-part rim capable of use in conjunction with an open-beaded tubeless pneumatic tire.

Another object of my invention is to provide a multi-part rim including sealing means for establishing an airtight relationship between all the rim parts, with the lateral pressure exerted on one or more beads of a tubeless tire when it is inflated being employed to deform the sealing means and effect sealing pressure between the rim parts, and wherein the rim parts telescope in relation to each other with the gasket alone limiting the telescoping movement.

Another object of my invention is the provision of a relatively inexpensive, mechanically strong, and long-lived combination of a tubeless open-beaded pneumatic tire, a multi-part rim including a removable side ring, and gasket means for sealing between the rim parts to render them airtight, and wherein the gasket functions in sealing capacity regardless of extreme limits in manufacturing tolerances of the rim parts.

Another object of my invention is to provide a pneumatic tire rim including an endless rim base having an integral retaining flange at one edge thereof and a gutter portion at its other edge, an endless removable side flange, a split locking ring, and a rubber-like gasket positioned in a pocket defined by the rim base, the side flange, and the locking ring, the side flange under the lateral pressure of a tire bead telescoping with relation to the locking ring, the lateral movement of the side flange being limited solely by the gasket.

Another object of my invention is to provide a structure of the character described and having a ribbed gasket or a ribbed telescoping pocket.

The foregoing objects of my invention, and others which will become apparent as the description proceeds, are achieved by the provision of a rim for use with a large open-beaded pneumatic tire casing of the tubeless type, the rim comprising an endless rim base, an endless removable side flange, a split lock ring received in a gutter at the side of the rim base, and a ring-shaped gasket of rubber-like material, the gasket being confined on all sides in a telescoping type pocket defined by the rim base, the side flange, and the lock ring, the gasket being subjected to the full lateral thrust of the bead of the tire when the tire is inflated and regardless of rim tolerances.

Also described and claimed is the combination of an open-beaded pneumatic tire casing of the tubeless type mounted upon a multi-part rim having gasket sealing means between the rim parts to effect an airtight closure between the beads of the tire when it is inflated, the combination including a valve stem extending in sealed relation through the rim base.

For a better understanding of my invention reference should be had to the accompanying drawings wherein Fig. 1 is a fragmentary cross-sectional view at less than full scale through an open-beaded tubeless pneumatic tire and multi-part rim combination incorporating the principles of my invention;

Fig. 6 shows in cross-section and almost to full scale still another embodiment of the principles of my invention as employed in conjunction with a large rim adapted for use with earth mover tires, or the like, the gasket being shown in non-compressed position;

Fig. 7 is a fragmentary view similar to Fig. 6 but illustrating the gasket in compressed position.

Fig. 8 is a view similar to Fig. 7 but showing the gasket compressed in a rim having parts with maximum tolerance difference;

Fig. 9 is like Fig. 8 but illustrates the compressed gasket with minimum tolerance difference in the rim parts;

Fig. 10 is a cross-section of a ribbed gasket; and

Fig. 11 is a cross-section of an uncompressed gasket received in a ribbed pocket in the rim assembly.

Figure 1:
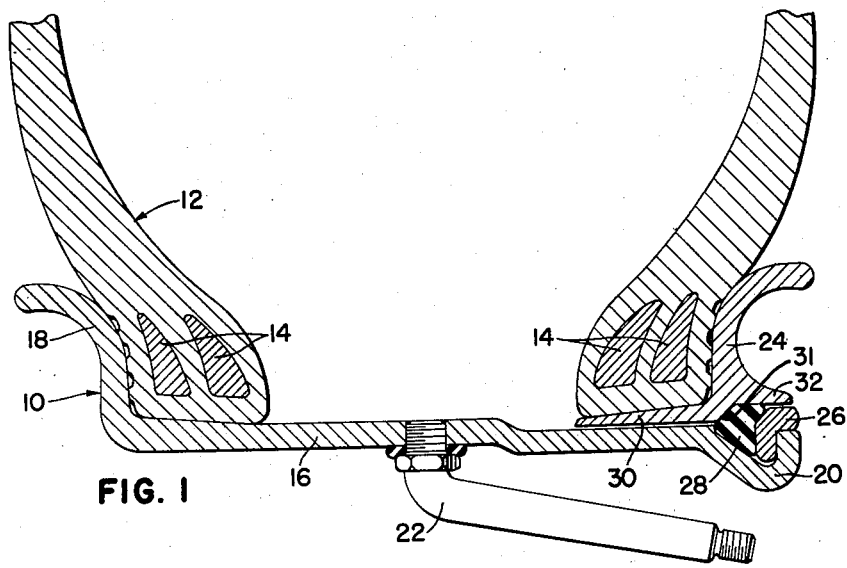

Having particular reference to Fig. 1 of the drawings, the numeral 10 indicates generally a multi-part rim removably mounting a relatively large pneumatic tire 12 of the tubeless open-beaded type, and adapted for use on a bus, truck, earth mover, or the like. The tire 12 has a relatively heavy, inextensible metal bead structure, such as the double beads 14, which necessitate the multi-part rim 10 for facilitating mounting and demounting of the tire thereon.

The rim 10 includes an endless rim base 16 having an integral side flange 18 at one side, and an integral gutter 20 at the other side. A valve stem 22 is connected to the rim base 16 and extends therethrough in sealed relation. Removably received upon the rim base 16 is an endless side ring or flange 24, this side ring being removably locked on the rim base by means of a split locking ring 26 removably received in the gutter 20 of the rim base 16.

Completing the rim assembly, and rendering the multipart rim airtight between the beads of the pneumatic tire 12 is an endless or ring-shaped gasket of rubber or rubber-like material 28 which is received in a pocket defined by the rim base 16, the side ring 24, and the locking ring 26. The pocket receiving the gasket 28 is of telescoping character, that is there is nothing except the gasket 28 itself which limits the lateral movement of the side ring 24 under the pressure applied to the side ring by the tire bead when the tire is inflated on the rim. It will be noted that the side ring 24 has an endless cylindrical flange portion 30 slidably supported on the rim base 16, and that the side ring 24 has a second cylindrical flange portion 32 which telescopes over the locking ring 26. Extending between the first cylindrical portion 30 and the second cylindrical portion 32 of the side ring 24 is a generally radially extending wall portion 31. Thus, the side thrust on the side ring 24 by the pneumatic tire bead is only limited by the gasket 28 with the side ring being free to move laterally against the gasket (regardless of rim tolerances as hereinafter discussed) to apply relatively high sealing pressures thereon. The pressures applied by the side ring 24 to the gasket 28 cause the rubber-like material of the gasket to flow within the confines of the pocket to apply substantially identical pressures per unit area to the rim base 16, the side ring 24, and the locking ring 26 to thereby achieve a very effective seal.

The sealing ring or gasket 28 has been described as being of rubber-like or rubber material, and suitable materials include natural rubber, synthetic rubber of oil resistant or other type, and with the rubber ordinarily being compounded to a strong consistency, such as a tough, flexible tire tread stock with suitable flow characteristics.

Figure 2:
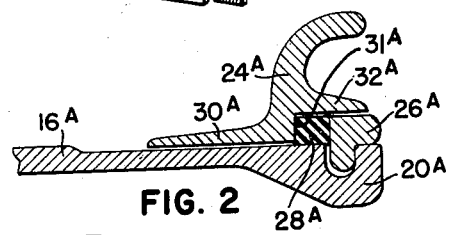
Fig. 2 is a fragmentary cross-sectional view of a modified multi-part rim including gasket sealing means.

The embodiment of the invention illustrated in Fig. 2 includes an endless rim base 16a, an endless side ring 24a, gutter portion 20a, a split locking ring 26a, and a rubber-like sealing ring 28a received in a pocket between the rim base, side ring and the locking ring. The side ring 24a has a cylindrical base portion 30a slidably supported on the rim base, a second cylindrical portion 32a which slides over the locking ring 26a, and a generally radially extending wall portion 31a joining the first and second cylindrical portions of the side ring so that lateral outboard thrust on the side ring 24a by a pneumatic tire in the use of the rim is confined and limited solely by the compression of the sealing ring 28a.

Figure 4:
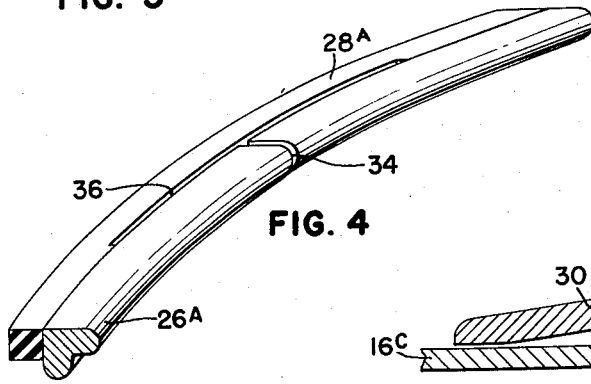
Fig. 4 shows in broken-away perspective how the rubber-like sealing ring may be secured to a split metal lock ring.

Fig. 4 illustrates that the sealing ring 28a can be secured to the split locking ring 26a, as by vulcanization and/or adhesive for the full circumferential length of the locking ring, but in the region of the split 34 of the lock ring the sealing ring is separated from the locking ring for several inches on each side of the split 34, as by a knife cut 36, or by providing a removable separating strip between the sealing ring 28a and the locking ring 26a in the region of the split 34 to prevent the vulcanization or adhesion of the sealing ring to the locking ring in the manner shown. The separation 36 facilitates, of course, the normal function of the split in the locking ring, namely, the expanding of the locking ring to allow its movement into and out of the gutter 20a.

Figure 3:
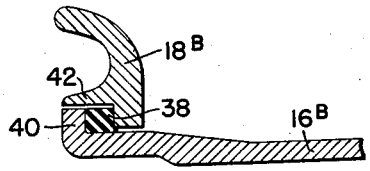
Fig. 3 illustrates in fragmentary section the manner of sealing between an endless rim base and an endless side ring.

Fig. 3 illustrates that a removable endless side ring or side flange 18b can be provided in association with an endless rim base 16b, with a sealing ring gasket 38 being provided in a pocket formed between the side flange 18b and the rim base 16b. To provide the pocket a short flange 40 is formed at one edge of the rim base 16b, and the side ring or flange 18b is provided with a cylindrical flange 42 extending slidably over the flange 40. The structure shown in Fig. 3 can be employed as a removable inboard side flange on a flat rim base, substantially in the manner that is sometimes now done, it being simpler to form on a large rim the side flange separately from the base rim.

Figure 5:
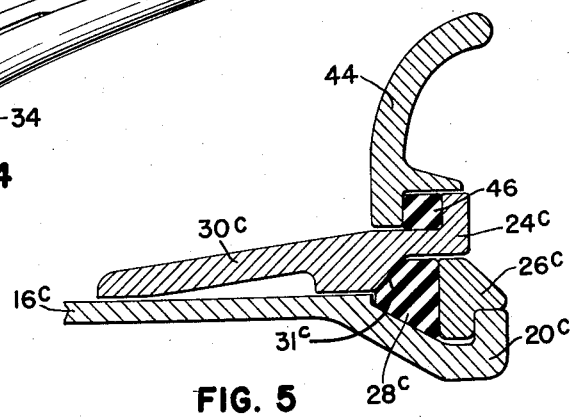
Fig. 5 is a fragmentary cross-sectional view of a modified form of my invention in which a pair of sealing rings are employed in conjunction with a multi-part rim.

Fig. 5 illustrates another form of the invention in which an endless rim base 16c is provided having an integral gutter 20c along one edge, the gutter removably receiving a split locking ring 26c. Included in the combination is a side ring 24c having a cylindrical flange portion 30c slidably received upon the rim base and a generally radially extending wall portion 31c. A sealing ring 28c of rubber or rubber-like material is received in a pocket defined by the rim base, the side ring and the locking ring, and with this seal functioning in the manner heretofore described. Instead of making the tire retaining flange integral with the side ring 24c the tire retaining flange 44 is made as a separate piece, and a sealing ring 46 effects a seal between the side ring 24c and the tire retaining flange 44, substantially in accord with the structure illustrated in Fig. 3. On a large earth mover tire rim making the tire retaining flange 44 separate from the side ring 24c is often desirable.

The embodiment of the invention shown in Fig. 6 includes an endless rim base 16d having an integral gutter portion 20d formed at one edge, the gutter portion removably receiving a split locking ring 26d and removably holding in position a side ring or flange 24d. The side ring 24d instead of being rolled or formed from a single piece of metal is fabricated from a plurality of separate parts which are welded together as shown, and including a first cylindrical flange portion 30d slidably supported upon the rim base, a second cylindrical flange portion 32d slidable over the locking ring 26d, and a generally radially extending wall portion 31d joining the first and second cylindrical portions. A sealing ring or gasket 28d is provided in the pocket between the rim base 16d, the side ring 24d and the locking ring 26d. The resulting rim structure is particularly adapted for use with large earth mover tires or the like, and functions in the manner previously described.

Fig. 6 illustrates the gasket 28d in uncompressed position, and with the side ring 24d merely touching the inboard side of the gasket and with the gasket touching the inboard side of the locking ring 26d. In Fig. 7 exactly the same parts are shown as in Fig. 6, but in Fig. 7 the gasket 28d is shown in the position that it takes when it is compressed by lateral movement of the side ring 24d under the inflation pressure of the tire mounted on the rim.

In Figs. 1 to 7 of the drawings the rim parts have been illustrated with average tolerance clearances. An average design clearance, i.e. the desired manufacturing clearance between these large rim parts is usually about .05 inch in diameter and the rim parts themselves are held within ±.015 inch in diameter. Closer tolerances are not easily achieved in commercial production operations, it being understood that rim parts are ordinarily not machined with respect to or on their engaging surfaces, but instead, the rim parts are usually rolled to shape, and are given a final sizing operation in suitable dies. With rolling and sizing operations of the type described variations in exact metal composition, the degrees of cold work done in rolling, and attendant variations in metal springback after sizing, means that tolerances of the character indicated are representative of what can be achieved in commercial production operations.

In Figs. 8 and 9 I have illustrated the ways in which the rim structure of my invention operates satisfactorily, and as designed, regardless of the maximum and minimum manufacturing tolerances in the rim parts. More specifically, in Fig. 8 is shown a maximum tolerance condition wherein the rim base 16e is illustrated with minimum tolerance, that is −.015 inch in diameter, and the side ring 24e is shown with maximum tolerance, i.e. +.015 inch in diameter, and this gives, with the designed clearance, a total clearance between the rim base and the side ring of approximately .040 of an inch on a radius, i.e. when the rim parts are concentric, and about .080 of an inch when the side ring is at maximum eccentricity with respect to the rim base. Regardless of this maximum clearance between the rim parts, the gasket 28e still functions as the sole means limiting lateral movement of the side flange 24e, and excellent sealing of the rim parts is achieved upon inflation of the tubeless tire mounted on the rim. It is true that the side ring moves laterally somewhat farther than it does in the average tolerance rim combination of Fig. 7.

In Fig. 9 is shown the same combination as is illustrated in Figs. 7 and 8, but with minimum tolerance rim parts. Specifically, the rim base 16f has a maximum tolerance of +.015 inch in diameter, and the side ring 24f has a minimum inside tolerance of —.015 inch in diameter, these maximum and minimum tolerances using up all but about .010 inch on a radius of the normal design clearance of .050 of an inch between the rim parts so that the side ring has a relatively close sliding fit on the rim base. With the side ring and rim base concentric in this minimum tolerance condition, a clearance of about .010 inch is present between the side ring and rim base around the complete circumference, and a clearance of about .020 inch exists with the side ring at maximum eccentricity with the base. Nonetheless lateral pressure upon the side ring 24f by the inflated tire mounted on the rim presses the gasket 28f in exactly the same manner as before to achieve excellent sealing of the rim parts. It is true that the side ring 24f does not move laterally as far in achieving the sealing action as it does in the average tolerance rim assembly in Fig. 7, and this has been shown on the drawing.

In addition, to the tolerances discussed in the preceding several paragraphs, there is usually a further commercial manufacturing tolerance permitting approximately .0125 inch on diameter out of round on rim parts. However, variations in these tolerances as well have no effect on the excellent seal achieved by my structure.

In Fig. 10 I have shown a gasket 28g as being formed with a plurality of circumferentially extending ribs 50 on one or more sides of the gasket to assist in effecting a seal between the gasket and the walls of the pocket in which it is received. It will be recognized that such sealing ribs may be incorporated with any of the gaskets illustrated in the other forms of the invention.

Fig. 11 shows that the walls of a pocket receiving a gasket 28h may, alternatively, or concurrently, be provided with sealing ribs 52, again for the purpose of enhancing the seal between the gasket and the rim parts.

The rim parts of the various forms of the invention shown are of metal, usually of high strength steel, or steel alloys, but it is equally evident that some or all of the rim parts could be made from strong light metal alloys in special applications and loads.

It will be seen that the objects of my invention have been achieved by the provision of relatively simple, inexpensive and yet highly durable multi-part rim structures for mounting open-beaded pneumatic tires of large size, and with the rim structures effecting an airtight seal between the beads of the tire. By confining the sealing ring in a telescoping type pocket as shown and described the lateral thrust of the pneumatic tire bead is always employed to effect a pressure seal regardless of rim part manufacturing tolerances. The gasket alone limits the lateral movement of the side ring so that high sealing pressures are achieved. Confining the sealing ring in the pocket of telescopic type means that the gasket has no place to escape to except through the relatively small clearances between the telescopic parts, and the gasket has a long life. Even as the gasket adjusts itself and deforms under pressure the follow-up of the side ring insures a high pressure seal over long periods of use of the rim, and in spite of the normal road shocks, vibrations, and poundings to which the rim and rim parts are inherently subject in use.

While in accord with the patent statutes I have specifically illustrated and described at least one best known embodiment of my invention, it is to be particularly understood that I am not to be limited to the specific showings herein contained, but that the scope of my invention is defined in the appended claims.

I claim:

1. An airtight multi-part rim for a large tubeless pneumatic tire, such as a truck, bus, or earth mover tire, and comprising an endless rim base, an endless side ring axially movable over at least a portion of the rim base, a split locking ring, one side of the rim base having a gutter removably receiving the locking ring and holding the locking ring so that a portion of it projects radially outwardly of the rim base, a first cylindrical portion on the side ring having axial sliding engagement with the rim base, a second cylindrical portion on the side ring offset radially and axially outward from the first cylindrical portion and encircling the projecting portion of the locking ring, a generally radially extending wall portion joining the first and second cylindrical portions of the side ring, said second cylindrical portion on the side ring passing over the radially outer portion of the locking ring with a close sliding fit, said generally radially extending wall portion, the second cylindrical portion, the rim base, and the locking ring defining a fully enclosed endless pocket of appreciable cross section, and an endless rubber-like gasket positioned in and substantially filling the pocket and engaging with the generally radially extending wall portion, the second cylindrical portion, the rim base and the locking ring, said second cylindrical portion of the side ring having an axial length greater than the axial thickness of the gasket.

2. A pneumatic tire rim comprising an endless metal rim base, an endless metal side ring, a split metal locking ring, and a ring-shaped rubber gasket, said gasket being positioned in a pocket bounded on the axially inner side by the side ring, on the axially outer side by the locking ring, on the radially inner side by the rim base and the radially outer side by the side ring, said side ring having a cylindrical portion for seating on said rim base and a cylindrical portion offset radially and axially outward thereof to extend, when operatively assembled, telescopically over the gasket and the locking ring, said last-named cylindrical portion having an inside diameter substantially equal to the outside diameter of the gasket, and with the telescoping being limited only by the compression of the gasket against the locking ring and the other walls of the pocket, and a valve stem extending in sealed relation through the rim base.

3. An airtight multi-part metal rim for a tubeless tire comprising an endless rim base having a gutter at one edge and a tire retaining flange at the other edge, a split locking ring removably positioned in the gutter and protruding radially outward beyond the gutter and the rim base to form substantially a radial shoulder, an endless tire retaining side ring having a cylindrical portion slidably encircling the rim base and another cylindrical portion slidably encircling the outer circumference of the locking ring and substantially a radially-directed shoulder portion connecting the two cylindrical portions of the side ring, said rim base, locking ring and side ring defining a circumferentially extending pocket, and an endless ring-shaped gasket of rubber-like material received in the pocket and shaped to fit and fill the pocket, said second-named cylindrical portion of said side ring having an inside diameter substantially equal to the outside diameter of the gasket and being of greater axial length than the gasket and slidably encircling the gasket, the side ring being free for comprehensive axial movement against the gasket by pressure exerted on the side ring by an inflated tire mounted on the rim, the gasket being squeezed between the substantially radial shoulder of the locking ring and the substantially radially-directed shoulder portion of the side ring to cause the gasket to completely fill and pressure seal the pocket, the shoulder of the locking ring and shoulder portion of the side ring engaging in metal to metal contact only if the gasket is extruded out of the pocket.

References Cited in the file of this patent

UNITED STATES PATENTS

| | | |
|---|---|---|
| 1,132,898 | Austin | Mar. 23, 1915 |
| 1,961,095 | Baker et al. | May 29, 1934 |
| 2,468,947 | Sinclair | May 3, 1949 |
| 2,563,787 | Keefe | Aug. 7, 1951 |
| 2,822,021 | Shipman et al. | Feb. 4, 1958 |

FOREIGN PATENTS

| | | |
|---|---|---|
| 305,533 | Great Britain | Oct. 10, 1929 |

UNITED STATES PATENT OFFICE
CERTIFICATE OF CORRECTION

Patent No. 2,894,556                                             July 14, 1959

Burgess Darrow

It is hereby certified that error appears in the printed specification of the above numbered patent requiring correction and that the said Letters Patent should read as corrected below.

Column 6, line 75, for "comprehensive" read -- compressive --.

Signed and sealed this 29th day of December 1959.

(SEAL)
Attest:

KARL H. AXLINE                                             ROBERT C. WATSON
Attesting Officer                                          Commissioner of Patents